United States Patent [19]

Siegfried et al.

[11] Patent Number: 5,180,253

[45] Date of Patent: Jan. 19, 1993

[54] ARRANGEMENT OF PRESTRESSING TENDONS IN A PRESSURE TUNNEL

[76] Inventors: Erwin Siegfried, Primelweg 8, 3097 Liebefeld; Peter Marti, Riedlistrasse 56, 3123 Belp, both of Switzerland

[21] Appl. No.: 744,325

[22] Filed: Aug. 13, 1991

[30] Foreign Application Priority Data

Aug. 24, 1990 [CH] Switzerland .......................... 2751/90

[51] Int. Cl.$^5$ ............................................. E21D 11/00
[52] U.S. Cl. ..................................... 405/146; 52/226; 405/150.1
[58] Field of Search ...................... 405/154, 146, 150.1; 52/224, 225, 226, 648; 138/176, 174

[56] References Cited

U.S. PATENT DOCUMENTS

| | | | |
|---|---|---|---|
| 729,299 | 5/1903 | Ellinger et al. | 52/648 |
| 756,309 | 4/1904 | Wight | 52/648 X |
| 841,064 | 1/1907 | Stanley | 52/648 X |
| 865,336 | 9/1907 | Gardner | 52/648 X |
| 865,488 | 9/1907 | Graham | 52/226 |
| 3,504,474 | 4/1970 | Dykmans | 52/224 X |
| 4,031,685 | 6/1977 | Heinz | 138/176 X |
| 4,251,047 | 2/1981 | Holtvogt | 52/226 X |
| 4,938,627 | 7/1990 | Lee | 405/154 |

FOREIGN PATENT DOCUMENTS 948094  1/1964  United Kingdom ............ 52/225

*Primary Examiner*—Dennis L. Taylor
*Attorney, Agent, or Firm*—Oldham, Oldham & Wilson

[57] ABSTRACT

Each of the prestressing tendons (3, 4, 18) in a pressure tunnel is made up of a bundle of monostrands (21) held together. Each of the monostrands (21) of one of the prestressing tendons is distanced from adjacent monostrands by the introduction of spacing means (22, 22', 22", 22'") at more or less regular intervals along the length of the prestressing tendon. Distributed along the length of and over the circumference of the pressure tunnel are disposed prestressing tendon supports (9) directed essentially towards the center of the pressure tunnel. Several prestressing tendons (3, 4, 18) are attachable to each of the prestressing tendon supports (9) adjacent to or stacked on top of each other. In doing so, each prestressing tendon (3, 4, 18) is kept spaced from adjacent tendons. The prestressing tendon arrangement ensures that after concreting the pressure tunnel, each of the monostrands is completely embedded in concrete. Each monostrand may be individually prestressed with a relatively small jack without there being any risk of damaging the monostrand in question or adjacent monostrands as result of stressing. The arrangement allows a relatively large number of monostrands to be disposed in any one cross-section and complete corrosion protection is guaranteed for each of the monostrands.

10 Claims, 3 Drawing Sheets

ARRANGEMENT OF PRESTRESSING TENDONS IN A PRESSURE TUNNEL

This invention concerns the arrangement of prestressing tendons in a pressure tunnel, each of the prestressing tendons comprising a bundle of monostrands, said bundle being held together at approximately regular intervals, and each of the placed prestressing tendons being attached by fixing devices disposed along the length of the prestressing tendon.

When constructing for example, a pressure tunnel embedded in rock, with a prestressed concrete lining, prestressing tendons are placed around the circumference of the pressure tunnel prior to the concreting of a section of pressure tunnel. These prestressing tendons are usually arranged adjacent to each other in the longitudinal direction of the pressure tunnel. Depending on the influence of various forces, such as for example the water pressure foreseen in the pressure tunnel and the nature and overlie of the rock, different quantities of prestressing tendons are required.

In a first prior art embodiment, such prestressing tendons may consist of a bundle of high-strength seven-wire prestressing steel strands running in a duct which is subsequently grouted with free-flowing cement grout. In the construction of pressure tunnels, this form of embodiment proves costly as regards both the installation and the grouting out. Particularly in a pressure tunnel running in an essentially horizontal direction, the ventilation for the grouting is unfavourable since this must take place at the top of the pressure tunnel. Moreover, care must be taken that the diameter of the duct is sufficiently large, so that the cement grout can encase the prestressing steel strands over the whole length of the duct. In pressure tunnels with high water pressure it may be that because large duct diameters are selected, it is impossible to incorporate sufficient prestressing tendons since particular care must be taken that between the ducts disposed next to each other, there is maintained sufficient distance for introducing the concrete when constructing the concrete lining.

A second embodiment belonging to the state of the art provides for the use of prestressing tendons which are made up of a bundle of so-called monostrands. Each of these monostrands comprises a seven-wire prestressing steel strand which is covered with permanent corrosion preventing grease and encased in a plastic sheath. Several of such monostrands are brought together to form a bundle by e.g. wrapping around with adhesive tape at approximately regular intervals. The prestressing tendons of the second type of embodiment are placed direct without duct and after the construction of the concrete lining, are encased by concrete. They need less space than the prestressing tendons of the first-mentioned form of embodiment. A greater number of prestressing tendons can therefore be passed through at any one point of the cross-sectional surface.

A further advantage of the use of prestressing tendons made with monostrands is that they demonstrate less frictional losses than bare prestressing steel strands which are inserted in a duct. This means that more prestressing force can be introduced into the pressure tunnel.

Since the monostrands brought together as a bundle in this second form of embodiment also lie adjacent to each other after concreting, the possibility that when these tendons are prestressed, the plastic sheaths of the individual monostrands will not rub against each other cannot be excluded. This could cause damage to the insulation and later on, corrosion damage to the prestressing steel strands.

In both the aforementioned embodiments of the prestressing tendons, the bundles of strands of a tendon are simultaneously prestressed with a stressing jack. The jacks required for this are correspondingly heavy and awkward to operate, particularly inside the pressure tunnel. Moreover, it should be noted that due to the spreading of the bundle of strands at the stressing anchor, which is usually disposed in a recess provided for this purpose, more valuable space for placing prestressing tendons is lost. In order to keep the prestressing force constant in each cross-section of the pressure tunnel, it is therefore intended that said recesses be staggered in their arrangement around the circumference of the pressure tunnel. Under certain circumstances, the aforementioned weighty and voluminous stressing jacks may therefore have to be used over the entire circumference of the pressure tunnel.

Although it is known to prestress one steel strand after the other with a smaller pressing jack instead of the whole bundle of strands, such a procedure cannot be used with the aforementioned types of prestressing tendons since the danger of damage to adjacent prestressing steel strands or monostrands due to chafing against each other during prestressing is unacceptably high.

It is therefore the task of this invention to disclose an arrangement of prestressing tendons in a pressure tunnel which overcomes the aforementioned disadvantages. In particular, the arrangement should prevent the mutual damage of individual monostrands of a prestressing tendon during prestressing, and should also make it possible to arrange the greatest possible number of monostrands on the smallest available cross-section.

This task is solved with an arrangement of prestressing tendons wherein along the length of each prestressing tendon, means are provided to keep each of the monostrands at a distance from the adjacent monostrands and wherein the fixing devices comprise prestressing tendon supports essentially directed towards the axis of the pressure tunnel, said supports being designed so that several prestressing tendons can be affixed thereto and arranged at a distance from each other and adjacent to and/or stacked on top of one another.

According to the present invention, a single prestressing tendon comprises a bundle of monostrands, each of these monostrands being at a distance to the adjacent monostrand over its entire length. The distancing is advantageously achieved by placing or introducing spacers between the individual monostrands along the length of the prestressing tendon at more or less regular intervals. A prestressing tendon to be placed over the circumference of the prestressing tunnel is first prepared in an appropriate manner with the individual monostrands and the aforementioned spacers. Distributed over the circumference of the pressure tunnel are disposed prestressing tendon supports directed essentially towards the centre of the tunnel, to which one prepared prestressing tendon after the other can be attached. Several prestressing tendons consisting of a greater or fewer number of monostrands can be attached to each of the prestressing tendon supports. Each prestressing tendon is thus distanced from the adjacent prestressing tendons. It is essential that the prestressing tendon supports are designed so that the individual prestressing tendons can be arranged both next to each other as well as stacked on top of each other. The mutual distancing of the individual monostrands and their arrangement to form a prestressing tendon is selected so that when a section of pressure tunnel is concreted, there is the greatest possible certainty that each of the monostrands is surrounded with concrete.

The distances between the individual prestressing tendons are selected so that they are greater than the distances between the individual monostrands of the prestressing tendons. This facilitates the introduction and penetration of the concrete between the individual prestressing tendons. The added materials are advantageously selected so that the maximum grain diameter is somewhat smaller than the clear width between the individual prestressing tendons. Although in this case, the largest grains cannot penetrate between the individual monostrands, the percentually greater proportion of small grains in the added materials ensures that they are completely embedded in the concrete which is introduced.

By completly encasing each of the individual monostrands in concrete and arranging them at a distance from adjacent monostrands in the constructed concrete lining, each of these monostrands can be prestressed with a relatively small individual jack with no danger of damage to itself or to adjacent monostrands. Each monostrand being completely embedded in concrete also prevents the occurrence of individual pronounced deviations at the prestressing tendon supports. The forces of each of the prestressing steel strands which are directed during prestressing towards the inside of the tunnel, are thereby distributed almost uniformly over the entire length of the strands.

In order to be sure that each of the monostrands is completely encased by concrete, it has been shown that each of the prestressing tendons should comprise at most, five monostrands. These are preferably arranged as one central monostrand and four monostrands surrounding the latter.

The invention will now be described below by way of example in more detail, with reference to the drawings, in which.

Figure 1:
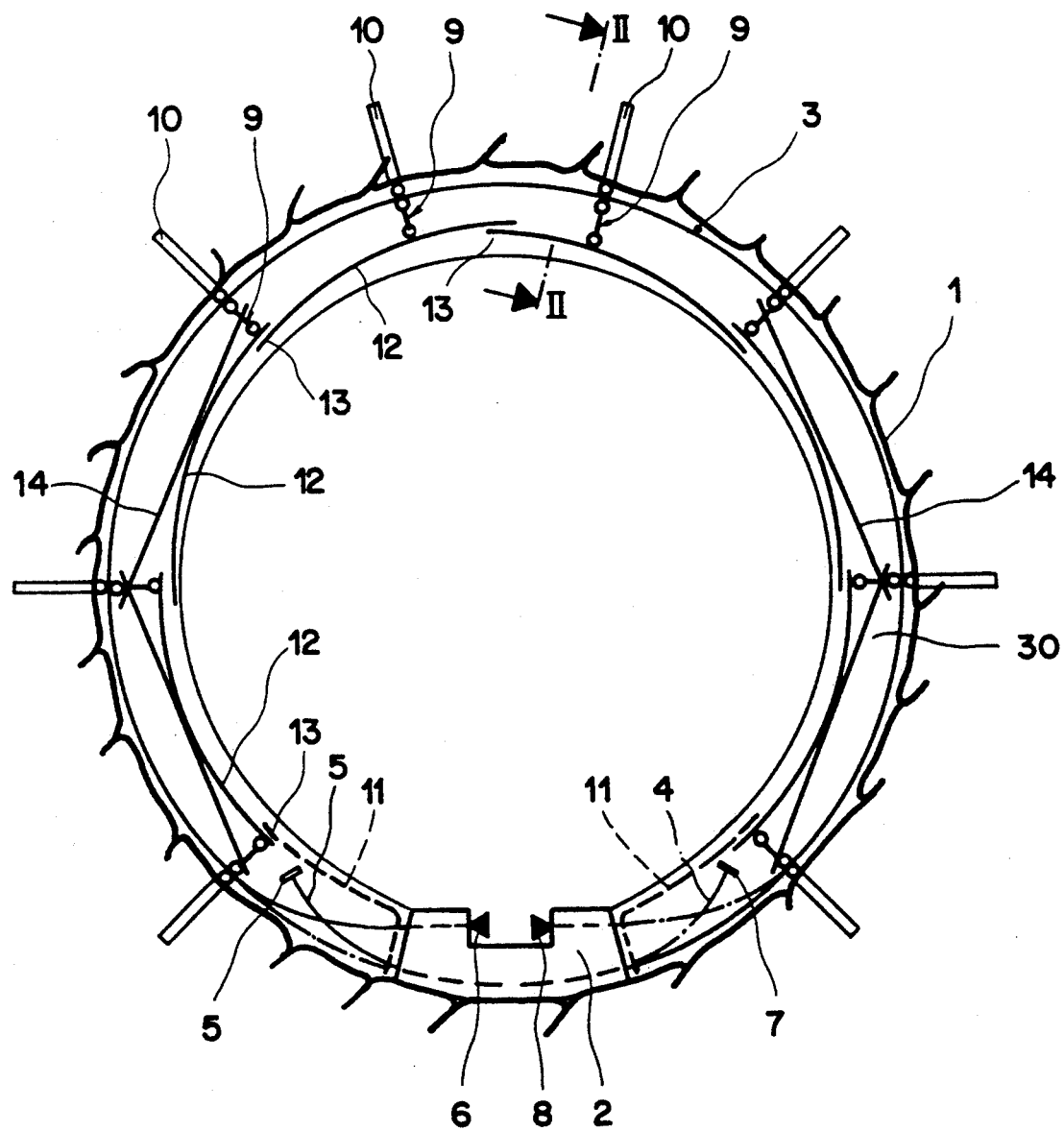
FIG. 1 is a cross-section through a pressure tunnel.

Reference numeral 1 of FIG. 1 designates the e.g. rocky wall of a cut out or bored out pressure tunnel. Reference numeral 2 designates a bottom element which is put together during the construction of the pressure tunnel and is used to transport machines and material along the bottom element in a manner not shown. A recent provision is to dispose prestressing anchors 6, 8 of prestressing tendons 3, 4 on arms of the bottom element projecting into the inside of the tunnel. The dead end anchorage assigned to each of the said tendons is designated in this Figure by the reference numerals 5, 7. Each of the prestressing tendons 3, 4, of which there are a plurality in the longitudinal direction of the pressure tunnel, runs around the circumference of the pressure tunnel. In order to achieve the greatest effect of a subsequent prestressing, the prestressing tendons 3, 4 preferably run as close as possible to wall 1. The prestressing tendons 3, 4 are attached to fixing devices, so-called prestressing tendon supports 9. Each of these prestressing tendon supports is directed essentially towards the centre of the pressure tunnel. Since several prestressing tendons 3, 4 are attachable either adjacent to each other and/or also stacked on top of one another to each of the prestressing tendon supports 9, although each of the prestressing tendons must be distanced in accordance with the invention from the adjacent prestressing tendon, the number of tendon supports distributed over the circumference of the pressure tunnel should be selected so that the above-mentioned requirement can be easily fulfilled. Distances of the order of 2 m between the individual prestressing tendon supports 9 in the circumferential direction of the pressure tunnel have proved to be expedient. This spacing is naturally also dependent on the diameter of the pressure tunnel and the rigidity of the prestressing tendon.

As will be seen further on, the prestressing tendon supports 9 are fixed to rock plugs 10. A number at least of the prestressing tendon supports 9 run over essentially the whole thickness of a subsequently provided concrete lining 30. Fixing elements to attach reinforcement nets 12 are provided on the end of these prestressing tendon supports 9 furthest away from the wall 1. The reinforcing block 13 is preferably disposed between two adjacent reinforcement nets 12 in the region of a prestressing tendon support 9. 11 designates the connection reinforcements which substantially connect the bottom element 2 with the reference nets 12.

14 designates fixing rods which are attached to two prestressing tendon supports adjacent in the circumferential direction of the pressure tunnel and to which e.g. the corresponding reinforcement net 12 is additionally attachable.

Figure 2:
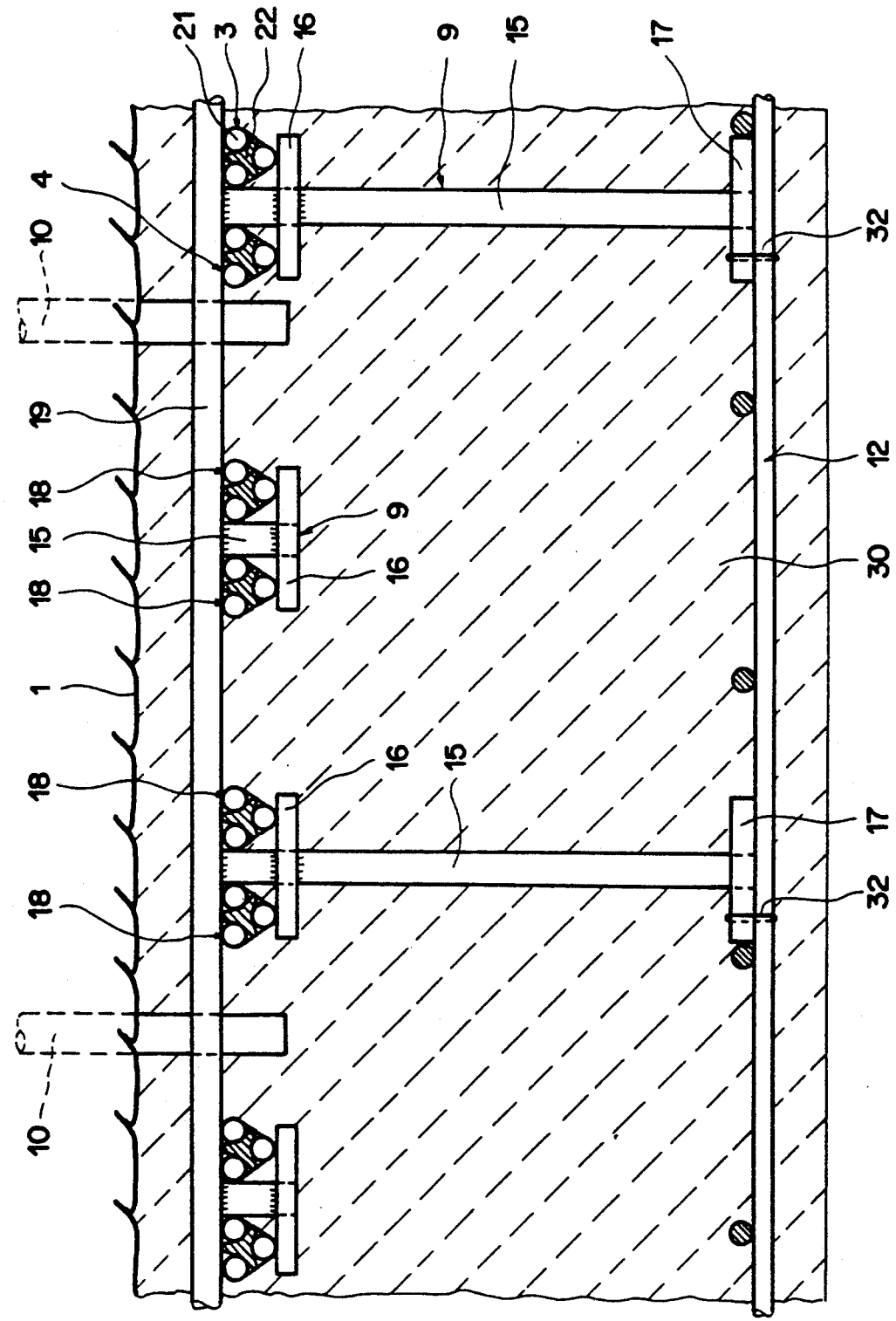
FIG. 2 is a section through the pressure tunnel wall along the line II—II of FIG. 1.

FIG. 2 shows a longitudinal section through a pressure tunnel wall along the line II—II of FIG. 1. Fixed at the ends projecting towards the inside of the tunnel and to the rock plugs 10 which are anchored at regular intervals along the length and in the circumferential direction of the pressure tunnel in the rock, is a longitudinal support 19. Prestressing tendon supports 9 are disposed at regular intervals along the length of the longitudinal support. Each of the prestressing tendon supports 9 has a bar 15 directed essentially towards the centre of the pressure tunnel, and at least one stave 16 running at approximately right angles to the bar and essentially parallel to the longitudinal support 19. This is intended to support prestressing tendons 3, 4, 18 placed on the side furthest away from the centre of the tunnel. In the embodiment illustrated, each of the prestressing tendons shown consists of three monostrands 21, which are spaced from each other by means of a spacer 22. Depending on the diameter of the pressure tunnel such spacers 22, which are elongated and have in cross-section the shape of a three-pointed star, are disposed at more or less regular intervals approximately every 1 to 1.5 m along the corresponding prestressing tendon. The monostrands resting on the spacer 22 may for example be held together with a tape which is periodically wound around along the length of the prestressing tendon.

In the embodiment shown in FIG. 2, every second prestressing tendon support 9 in the longitudinal direction of the pressure tunnel has a lengthened bar 15 which essentially exceeds beyond the thickness of the intended concrete lining 30. Attached to each end nearest the centre of the pressure tunnel of these lengthened bars, is a fixing element 17, which serves to fix the corresponding reinforcement net 12. Prior art wire binders 32 are used for the fixing.

Figure 3:
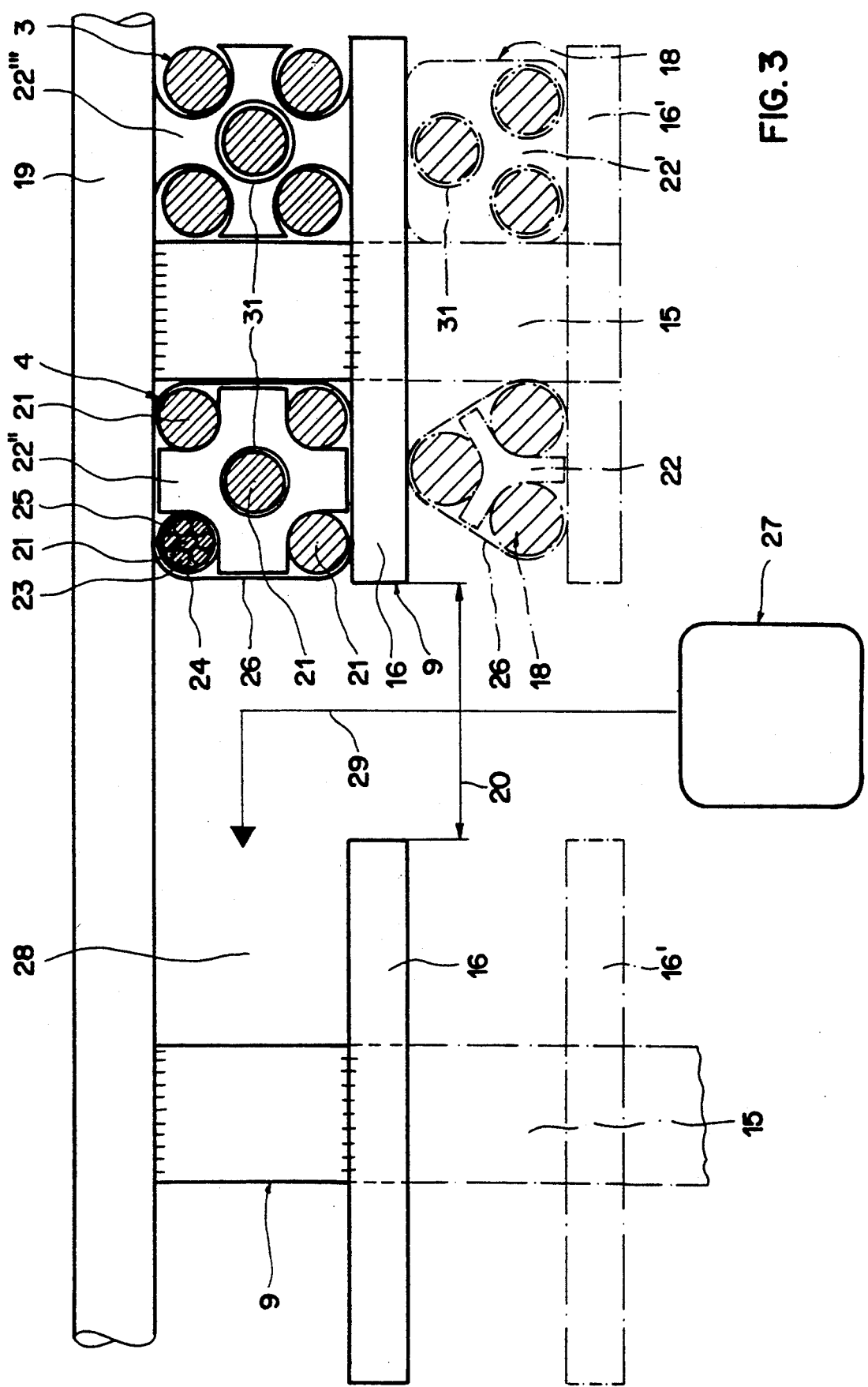
FIG. 3 is a detailed representation of a prestressing tendon support with prestressing tendons arranged thereon.

FIG. 3 shows in detail the arrangement of the prestressing tendons 3, 4, 18 on one prestressing tendon support 9. Attached to the bar 15 of the prestressing tendon support 9, which is attached to the longitudinal support 19, is a further stave 16' in addition to the said stave 16. Spaced from stave 16, this runs essentially parallel to the latter. A first and second prestressing tendon 3, 4, which both each comprise for example five monostrands 21, are disposed over the outer stave 16 with regard to the centre of the pressure tunnel. The first prestressing tendon 3 is located on one side of the bar 15 and the second prestressing tendon 4 on the other side. The width of the bar 15 ensures mutual spacing of the two aformentioned adjacent prestressing tendons 3, 4. The second prestressing tendon 4 comprises cross-shaped spacers 22' which have a pass-through opening in their centre. The spacers 22' are pushed onto a centrally disposed monostrand 21 at a distance from each other. An outer monostrand 21 is always disposed between each pair of arms of the cross-shaped spacer. The bundle is held together with a tape 26 which is wound around the former at more or less regular intervals. The prior art construction of an individual monostrand as already previously described, is also shown. 23 designates a single steel wire of the strand, 24 designates the plastic sheath and 25 the corrosion protection grease.

With one of the spacers 22''' which can be pushed onto all five monostrands of the first prestressing tendon 3, a variant of an embodiment is shown, wherein it is not necessary to use a tape to hold the bundle together. The spacer 22''' is also an elongated body, preferably made from plastic, with a cross-section similar to a Maltese cross.

Two other prestressing tendons 18 are disposed on the inner stave 16'. One prestressing tendon 18 running below or inside the second prestressing tendon 4 is already assembled as shown in FIG. 2. As a variation it would also be conceivable to provide spacers 22' with three pass-through openings 31, and to push these onto three monostrands, as shown in FIG. 3 with prestressing tendon 18, which is disposed below or inside the first prestressing tendon 3. The radial spacing between the individual prestressing tendons is determined by the thickness of the stave 16. Each pair of prestressing tendon supports 9 adjacent in the longitudinal direction must be disposed with at least sufficient distance between them to allow another prestressing tendon which is also to be placed, designated by reference numeral 27, to be inserted through the intermediate space designated by 20, along the arrow 29 and onto a prestressing tendon place 28 which is still free.

A single prestressing tendon as shown here requires a surface of approximately 50×50 mm².

The prestressing tendon arrangement according to the invention wherein the intervals between adjacent prestressing tendons are necessarily kept greater by the choice of prestressing tendon supports than the intervals between adjacent monostrands of individual prestressing tendons, ensures that each monostrand is completely encased by concrete after concreting of the pressure tunnel. The complete tendon-placing thereby achieved ensures a reliable corrosion protection. The monostrands disposed according to the invention can be individually prestressed with a relatively small stressing jack with no danger of damage. There is no risk of thereby damaging monostrands disposed adjacent thereto.

The prestressing tendon arrangement according to the invention can be used not only in the construction of pressure tunnels but also in other concrete structures where e.g. for reasons of space, the monostrands have to be individually prestressed and where complete corrosion protection has to be ensured. A large number of other variations of spacers is also conceivable.

We claim:

1. An arrangement of prestressing tendons in a pressure tunnel having a prestressed concrete lining, wherein each of the prestressing tendons comprises a bundle of monostrands, said bundle being held together at approximately regular intervals, and each of the prestressing tendons running essentially parallel to each other and along the circumference of the pressure tunnel opening which is above the earth's surface and being fixed to fixing devices along the prestressing tendon and anchored in the earth, wherein there are means along each of the prestressing tendons for keeping each monostrand of the corresponding bundle at a first distance from the adjacent monostrands, wherein the fixing devices are prestressing tendon supports directed essentially towards the longitudinal axis of the pressure tunnel, disposed along the circumference and along the longitudinal axis of the pressure tunnel, and wherein several of the prestressing tendons are fixed to each of the prestressing tendon supports, there being a second distance between the individual prestressing tendons in both the direction of the longitudinal axis of the pressure tunnel as well as in prestressing tendons adjacent to each other in the radial direction, and wherein the second distance at which the individual prestressing tendons are distanced from one another, is greater than the first distance at which the individual monostrands are distanced from each other within a prestressing tendon.

2. The arrangement of claim 1, wherein each prestressing tendon comprises at most five monostrands.

3. The arrangement according to claim 1, wherein the spacing between each of the individual monostrands (21) and adjacent monostrands (21) is kept at least large enough so that after concreting each monostrand (21) is completely surrounded by concrete.

4. The arrangement according to claim 1, wherein the spacing means are spacers disposed at essentially regular intervals between the individual monostrands of each one of the prestressing tendons.

5. The arrangement according to claim 4, wherein the spacers are essentially elongated bodies which can be inserted between the individual monostrands of each of the prestressing tendons.

6. The arrangement according to claim 5, wherein the spacers have one or several pass-through opening, a monostrand being able to be passed through each of these pass-through openings.

7. The arrangement according to claim 1, wherein the prestressing tendon supports are at least sufficiently spaced from each other in the direction of the longitudinal axis of the pressure tunnel to allow one single prestressing tendon to be passed through between two adjacent prestressing tendon supports.

8. The arrangement according to claim 1, wherein each of the prestressing tendon supports comprises a peg directed essentially towards the axis of the pressure tunnel and wherein at least one stave running essentially at right angles thereto and approximately parallel to the longitudinal axis of the pressure 9. The arrangement according to claim 9, wherein each of the prestressing tendons at each of the prestressing tendon supports to which it is attached, rests at least against the peg, and against one of the staves.

10. The arrangement according to claim 8, wherein the peg of at least on one part of the prestressing tendon support extends essentially beyond the thickness of the intended concrete lining, and wherein the staves are disposed in the region of the end of the peg furthest from the inside of the pressure tunnel, and reinforcement elements wherein the other end of the stave acts as a fixing element for the reinforcement elements.

* * * * *